(12) United States Patent
Wheatley et al.

(10) Patent No.: US 8,311,507 B2
(45) Date of Patent: Nov. 13, 2012

(54) TELEMATICS SYSTEMS AND RELATED CONNECTION METHODS FOR ESTABLISHING WIRELESS COMMUNICATION LINKS

(75) Inventors: Timothy John Wheatley, Crowthorne (GB); Mahendra J J Tailor, Middlesex (GB); Andrew Dobbing, Oving (GB)

(73) Assignee: Ezurio Limited, Woodburn Green (GB)

( * ) Notice: Subject to any disclaimer, the term of this patent is extended or adjusted under 35 U.S.C. 154(b) by 983 days.

(21) Appl. No.: 12/349,487

(22) Filed: Jan. 6, 2009

(65) Prior Publication Data
US 2010/0120373 A1    May 13, 2010

Related U.S. Application Data

(60) Provisional application No. 61/114,159, filed on Nov. 13, 2008.

(51) Int. Cl.
*H04B 1/16* (2006.01)
(52) U.S. Cl. .................. 455/343.6; 455/574; 455/556.1
(58) Field of Classification Search ............... 455/90.1, 455/456.1, 572, 573, 574, 575.9, 556.1, 343.1, 455/343.5, 343.6
See application file for complete search history.

(56) References Cited

U.S. PATENT DOCUMENTS

| | | |
|---|---|---|
| 4,804,937 A | 2/1989 | Barbiaux et al. |
| 5,794,164 A | 8/1998 | Beckert et al. |
| 6,009,363 A | 12/1999 | Beckert et al. |
| 6,202,008 B1 | 3/2001 | Beckert et al. |
| 6,611,740 B2 | 8/2003 | Lowrey et al. |
| 6,636,790 B1 | 10/2003 | Lightner et al. |
| 6,732,031 B1 | 5/2004 | Lightner et al. |
| 6,970,703 B2 * | 11/2005 | Fuchs et al. ............... 455/426.1 |
| 8,160,656 B2 * | 4/2012 | Van Bosch et al. ........... 455/574 |
| 2002/0115436 A1 * | 8/2002 | Howell et al. ................. 455/426 |
| 2002/0183036 A1 * | 12/2002 | Marko et al. .................. 455/343 |
| 2004/0127206 A1 * | 7/2004 | Van Bosch et al. ........... 455/418 |
| 2004/0127265 A1 * | 7/2004 | Van Bosch et al. ........... 455/574 |
| 2004/0198466 A1 * | 10/2004 | Walby et al. .................. 455/574 |
| 2005/0143146 A1 * | 6/2005 | Kim ............................... 455/574 |
| 2006/0149434 A1 | 7/2006 | Bertosa et al. |
| 2006/0247833 A1 | 11/2006 | Malhotra et al. |
| 2008/0278345 A1 * | 11/2008 | Van Bosch et al. ...... 340/870.07 |

* cited by examiner

*Primary Examiner* — Blane J Jackson
(74) *Attorney, Agent, or Firm* — Harness, Dickey & Pierce, P.L.C.

(57) ABSTRACT

Exemplary embodiments are provided of a telematics system for a vehicle with a main power supply. The telematics system includes a secondary power supply and a telematics unit that provides vehicle information. The telematics unit includes a communication device that selectively provides two-way communication between the telematics unit and an external device. The telematics system further includes a power management system that selectively causes the telematics unit to be powered by at least one of the main power supply and the secondary power supply. Further, the system includes a controller that controls the power management system such that the telematics unit is powered by the secondary power supply for communication between the telematics unit and the external device when the telematics unit is electrically disconnected from the main power supply.

15 Claims, 2 Drawing Sheets

Figure 1:
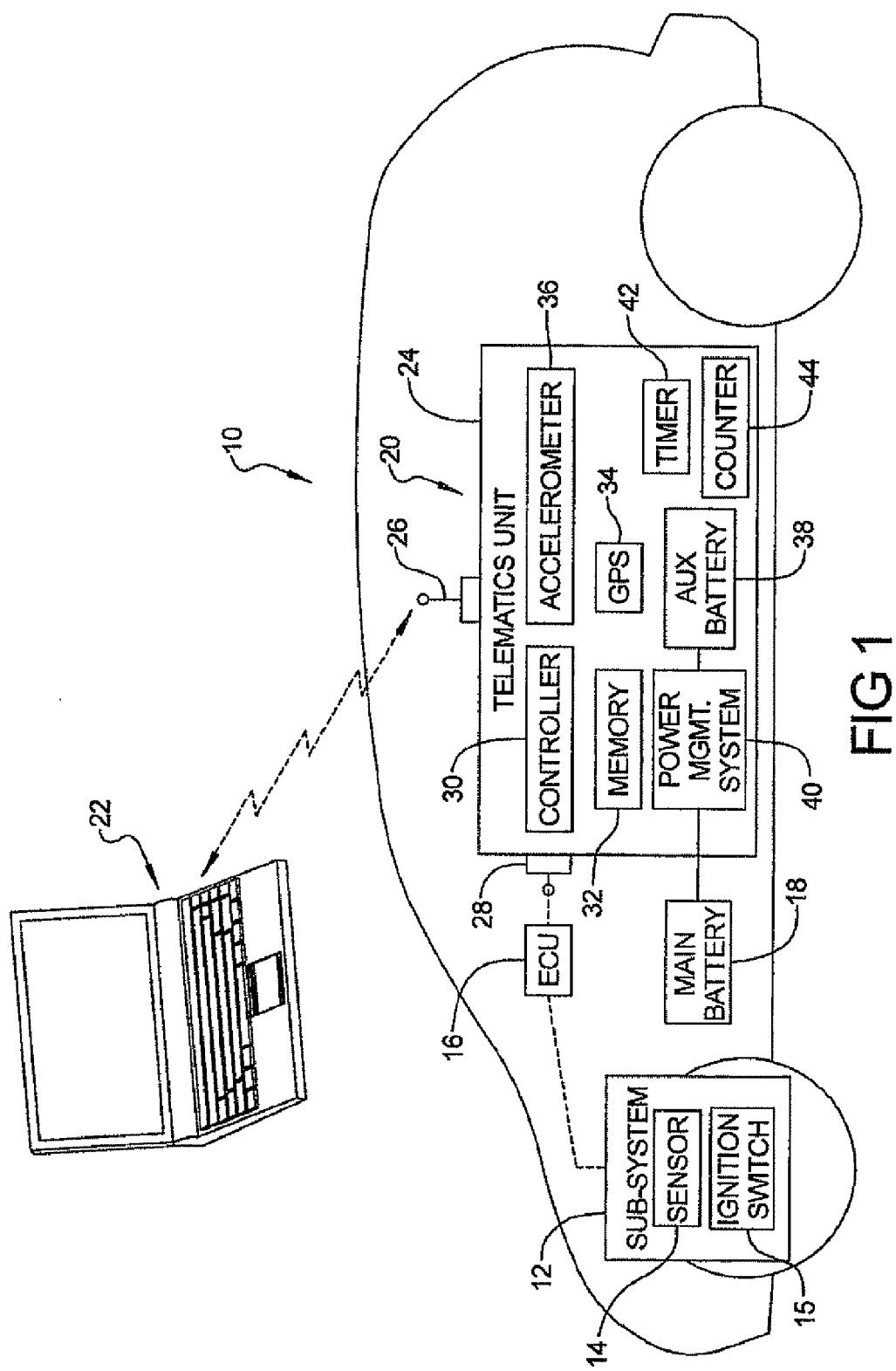

TELEMATICS SYSTEMS AND RELATED CONNECTION METHODS FOR ESTABLISHING WIRELESS COMMUNICATION LINKS

CROSS-REFERENCE TO RELATED APPLICATION

This application claims the benefit of U.S. Provisional Application No. 61/114,159 filed Nov. 13, 2008. The disclosure of the above application is incorporated herein by reference.

FIELD

The present disclosure generally relates to data relating to the use and operation of a vehicle. More specifically, the present disclosure relates to a system for communicating vehicle data and software updates between a vehicle and a device external to the vehicle.

BACKGROUND

The statements in this section merely provide background information related to the present disclosure and may not constitute prior art.

Many vehicles include a telematics system for detecting, monitoring, and recording certain information about the vehicle, such as vehicle speed and acceleration history data, tire pressure data, system malfunctions, vehicle location, maintenance information, and the like. This information can be used for a variety of purposes, such as pricing auto insurance, fleet management, accident investigation, recovering stolen vehicles, and the like.

Most conventional systems include a telematics unit, which operates using associated software (e.g., middleware and/or firmware). More specifically, the telematics unit obtains vehicle data (e.g., vehicle speed, acceleration, location, etc.) from sensors within the vehicle. The telematics unit controls which type and amount of data that is gathered from the sensors and controls how the data is processed and/or stored by the telematics unit.

The telematics unit can also include a diagnostics port, and the data stored on the telematics unit can be transmitted via the diagnostics port to an external unit, such as a personal computer. For instance, connecting wires can be attached between the diagnostics port and the external unit to upload the data stored on the telematics unit. Other systems include a wireless link device for wirelessly transmitting the data from the telematics unit to the external unit. Then, the external unit can further process, analyze, and/or display the vehicle data for maintenance, vehicle insurance, fleet management, and other purposes.

Also, in some cases, information is downloaded to the telematics unit from the external unit in order to synchronize the telematics unit and the external unit. For instance, it may be necessary to download a new, updated version or configuration of the telematics unit software. Also, users may wish to change the amount and/or type of data recorded by the telematics unit, and so the external device can be electrically connected to the telematics unit to make appropriate changes to the telematics software in the vehicle.

Typically, information is transferred to or from the telematics unit when the vehicle is stopped and the vehicle's main battery is supplying power to the telematics unit (e.g., when the ignition switch is in the "ENGINE ON" position or "ACCESSORY ON" position). Otherwise, if a transmitting device is connected to the diagnostics port and attempts to draw power from the vehicle's battery, the vehicle alarm system will likely be triggered. Accordingly, an extra person is typically needed in the vehicle for powering the vehicle during downloading or uploading of the vehicle information, and this can be an inconvenient and wasteful use of time for the person supplying power to the vehicle as well as an undesirable waste of vehicle battery power.

Other telematics systems include a removable memory device that can be manually transferred between the telematics unit and the external unit for data transfer. However, this manual process can also be inconvenient and cumbersome.

SUMMARY

According to various aspects, exemplary embodiments are provided of a telematics system for a vehicle with a main power supply. The telematics system includes a secondary power supply and a telematics unit that provides vehicle information. The telematics unit includes a communication device that selectively provides two-way communication between the telematics unit and an external device. The telematics system further includes a power management system that selectively causes the telematics unit to be powered by at least one of the main power supply and the secondary power supply. Further, the system includes a controller that controls the power management system such that the telematics unit is powered by the secondary power supply for communication between the telematics unit and the external device when the telematics unit is electrically disconnected from the main power supply.

Another exemplary embodiment provides a method of operating a vehicle telematics system. The method includes disconnecting a main power supply of the vehicle from the telematics unit. The method also includes electrically connecting a secondary power supply to the telematics unit with the main power supply disconnected from the telematics unit. Moreover, the method includes attempting to establish a two-way communication link between the telematics unit and an external device.

Other exemplary embodiments provide a telematics system for a vehicle with a main power supply. The telematics system includes a secondary power supply and a telematics unit that provides vehicle information. The telematics unit includes a wireless communication device that selectively provides two-way communication between the telematics unit and an external device. The system also includes a power management system that selectively causes the telematics unit to be powered by at least one of the main power supply and the secondary power supply. Further, the system includes a controller that controls the power management system such that the telematics unit is powered by the secondary power supply for wireless communication between the telematics unit and the external device with the telematics unit electrically disconnected from the main power supply. Further, the system includes a timer, wherein the controller causes the telematics unit to reduce power consumption for a predetermined amount of time as determined by the timer if the attempt to establish the wireless communication link fails. The controller causes the telematics unit to increase power consumption after the predetermined amount of time, and again attempt to establish the wireless communication link with the external device. Moreover, the system includes a counter that counts a number of failed attempts to establish the wireless communication link. The controller causes the telematics unit to reduce power consumption if the number of failed attempts equals a predetermined amount.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
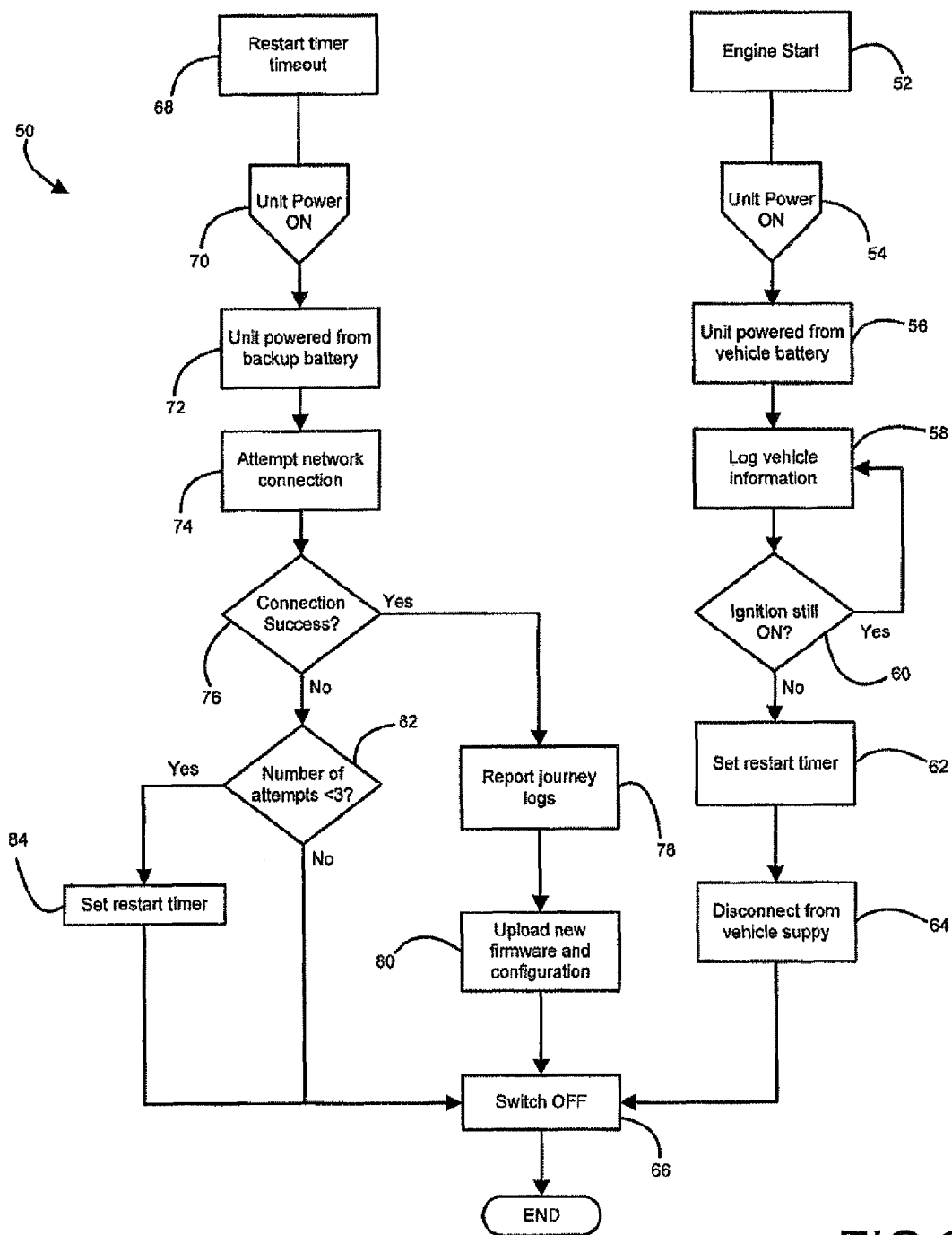

FIG. 1 is a schematic illustration of a telematics system according to exemplary embodiments of the present disclosure; and FIG. 2 is a flowchart illustrating a method of operation of the telematics system of FIG. 1 according to exemplary embodiments of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, a vehicle 10 is schematically illustrated. The vehicle 10 can be of any type, including but not limited to a car, truck, sports utility vehicle, motorcycle, and the like.

The vehicle 10 includes one or more subsystems, which are schematically illustrated and indicated at 12. The subsystem 12 can be of any suitable type, including but not limited to an engine system, a powertrain system, a tire system, an electrical system, global positioning system (GPS), fuel system, safety system, and the like.

In some embodiments, the subsystem 12 includes a sensor 14. The sensor 14 could be of any suitable type, such as an accelerometer, a flow sensor, a pressure sensor, a light sensor, a voltmeter, and the like. As will be discussed in greater detail, the sensor 14 is operable to detect vehicle information related to the associated subsystem 12. For instance, if the subsystem 12 is a safety system, the sensor 14 can be used to detect whether or not the driver is wearing a seatbelt properly. Also, if the subsystem 12 is an engine system, the sensor 14 can be used to detect an engine malfunction (e.g., a sparkplug misfire, etc.).

Also, as will be described, the subsystem 12 can include an ignition switch 15 of a vehicle ignition system. The ignition switch 15 can include a plurality of positions, such as an ENGINE ON position, an ACCESSORY ON position, an ENGINE START position, and an ENGINE OFF position.

The subsystem 12 and the sensor 14 can be in electrical communication with an engine control unit (ECU) 16. As such, the ECU 16 can receive the vehicle information from the subsystem 12.

Further, the vehicle 10 includes a main power supply 18. The main power supply 18 can be of any suitable type, such as one or more batteries, a super capacitor, and the like. As is known, the main power supply 18 is the main source of electrical power for the various subsystems 12 of the vehicle 10.

The vehicle 10 further includes a telematics system, generally indicated at 20. As will be discussed, the telematics system 20 gathers various vehicle information and communicates with an external device 22 (e.g., a computer, a local access point, and/or server, etc.) to further process the vehicle information. Accordingly, the telematics system 20 can be used for monitoring the vehicle 10, determining insurance rates, fleet management, accident investigation, and the like. Moreover, as will be discussed, the telematics system 20 employs a unique means and method of power management for communication with the external device 22 in an advantageous manner.

The telematics system 20 includes a telematics unit 24. The telematics unit 24 includes a communication device 26 that selectively provides two-way communication between the telematics unit 24 and the external device 22. The communication device 26 can be of any suitable type, such as a wireless communication device 26. In some embodiments, the communication device 26 can communicate via Bluetooth, WLAN, and/or GSM/GPRS protocols; however, it will be appreciated that the communication device 26 can communicate in any suitable wireless communication protocol. Moreover, in some embodiments, the communication device 26 includes connectors that enable wired communication with the external device 22. For instance, in some embodiments, the communication device 26 includes a USB interface. Accordingly, the telematics unit 24 can communicate either wirelessly or via wires with the external device 22.

Moreover, the telematics unit 24 includes a telematics connector 28. In the exemplary embodiment shown, the telematics connector 28 is in electrical communication with the ECU 16. In some embodiments, the telematics connector 28 is an on-board diagnostics (OBD) interface, such as an OBD II interface. Further, in some embodiments, the telematics connector 28 utilizes a self-contained PIC microcontroller to automatically detect which of the standard interfaces the vehicle 10 is equipped with. The telematics connector 28 enables communication with the ECU 16 to recover vehicle information from the subsystem 12. Moreover, in some embodiments, the telematics connector 28 supports a plurality of diagnostic standards, including SAE J1850 VPW, SAE J1939, SAE J1850 PWM, ISO 9141-2, ISO 14230-4, and ISO 15765-4 (CAN BUS). It will also be appreciated that the telematics connector 28 can be configured to communicate directly with the subsystem 12 to thereby receive the vehicle information.

Further, the telematics unit 24 includes a controller 30. In some embodiments, the controller 30 includes a microprocessor that is responsible for controlling all operations of the telematics unit 24 and for correct sequencing between the various operating modes of the telematics unit 24. Also, the controller 30 can communicate with the ECU 16 via the connector 28.

The telematics unit 24 may further include a memory device 32 for storing the vehicle information. The memory device 32 can be of any suitable type for storing data, such as flash memory. Moreover, in some embodiments, the memory device 32 can be removable from the telematics unit 24 for transporting the vehicle information from the vehicle 10.

In addition, the telematics unit 24 may include a global positioning system (GPS) 34. The GPS 34 is used to determine the location of the vehicle 10. It will be appreciated that the global position of the vehicle 10 detected by the GPS 34 can be considered vehicle information. It will also be appreciated that although the GPS 34 is illustrated as part of the telematics unit 24, the GPS 34 could be external to the telematics unit 24 without departing from the scope of the present disclosure. In some embodiments, the GPS 34 includes an external antenna (not shown) that communicates with an external GPS system for detecting the location of the vehicle 10.

Additionally, the telematics unit 24 may include an accelerometer 36. In some embodiments, the accelerometer 36 is a three-axis accelerometer with a range of 0-3 g; however, it will be appreciated that the accelerometer 36 could be of any suitable type without departing from the scope of the present disclosure. The accelerometer 36 detects acceleration and deceleration of the vehicle 10 and cornering forces of the vehicle 10 as it is being driven. It will be appreciated that the accelerometer 36 provides vehicle information that can be used for diagnostics purposes and/or assessment of how well the vehicle 10 is being driven. It will also be appreciated that, although the accelerometer 36 is illustrated within the telematics unit 24, the accelerometer 36 could be external from the telematics unit 24 without departing from the scope of the present disclosure.

The telematics unit 24 further includes a secondary power supply 38. The secondary power supply 38 can be of any suitable source of power, such as a lithium ion polymer battery pack, a super capacitor, and the like. As will be discussed, the telematics unit 24 is powered electrically by at least one of the main power supply 18 and the secondary power supply 38. Although the secondary power supply 38 is illustrated within the telematics unit 24, it will be appreciated that the secondary power supply 38 could be external to the telematics unit 24 without departing from the scope of the present disclosure.

Moreover, the telematics system 20 includes a power management system 40. As will be described, the power management system 40 selectively causes the telematics unit 24 to be powered by at least one of the main power supply 18 and the secondary power supply 38. More specifically, in some embodiments, the controller 30 can control the power management system 40 such that the telematics unit 24 is powered by the secondary power supply 38 when the telematics unit 24 is electrically disconnected from the main power supply 18. For instance, the telematics unit 24 detects when the vehicle ignition switch 15 is in the "ENGINE ON" or "ACCESSORY ON" position, and the controller 30 can control the power management system 40 such that the main power supply 18 of the vehicle 10 powers the telematics unit 24. Accordingly, the telematics unit 24 can gather and store vehicle information of the vehicle 10. Also, the telematics unit 24 detects when the vehicle ignition switch 15 is in the OFF position, and the controller 30 can control the power management system 40 such that the secondary power supply 38 powers the telematics unit 24. Accordingly, the telematics unit 24 can communicate with the external device 22 even when the ignition switch (not shown) is in the OFF position.

Further, in some embodiments, the telematics unit 24 includes a timer 42. As will be discussed, the timer 42 records an amount of time in which the telematics unit 24 is in a standby (a reduced power) mode, and once a predetermined amount of time has elapsed (as determined by the timer 42), the telematics unit 24 increases power consumption (powers up).

In some embodiments, the controller 30 causes the telematics unit 24 to reduce power consumption for a predetermined amount of time as determined by the timer 42 if an attempt to establish a wireless communication link with the external device 22 fails. Further, in some embodiments, the controller 30 causes the telematics unit 24 to increase power consumption (powers up) after the predetermined amount of time has elapsed (after the telematics unit 24 has been in standby mode for the predetermined time). Then, the controller 30 causes the communication device 26 to again attempt to establish the wireless communication link with the external device 22.

In addition, the telematics unit 24 may include a counter 44. As will be discussed, the counter 44 counts a number of failed attempts to establish the wireless communication link with the external device 22. More specifically, the controller 30 causes the telematics unit 24 to reduce power consumption when the number of failed attempts recorded by the counter 44 equals a predetermined amount.

Referring now to FIG. 2, a method 50 of operation of the telematics system 20 is illustrated. As shown, the method 50 can begin in step 52, in which a driver moves the ignition switch 15 from the ENGINE OFF position to the ENGINE START position to start the vehicle's engine. As a result, the controller 30 initiates powering up of telematics unit 24 in step 54, and the controller 30 controls the power management system 40 so that the main power supply 18 supplies power to the telematics unit 24 in step 56.

Then, in step 58, the telematics unit 24 enters a logging mode. In logging mode, vehicle information is gathered from the subsystem 12, the GPS 34, and/or the accelerometer 36 and logs the vehicle information in the memory 32. In some embodiments, the telematics unit 24 logs the vehicle information once every second. As shown in decision block 60, the telematics unit 24 remains in logging mode as long as the ignition switch 15 remains in the ENGINE ON position.

However, if decision block 60 is answered negatively, and the ignition switch 15 is in the ENGINE OFF position, the telematics unit 24 subsequently enters a standby mode, in which power consumption of the telematics unit 24 is substantially reduced. For instance, the telematics unit 24 continues to draw a nominal amount of power from either the main power supply 18 or the secondary power supply 38 when in the standby mode, and only the circuitry required to wake up the unit from standby mode is powered. Thus, in step 62, the timer 42 begins recording the amount of time that the telematics unit 24 is in standby mode. Accordingly, a restart timer of the timer 42 is set in step 62, and the controller 30 causes the power management system 40 to disconnect the telematics unit 24 from the main power supply 18 in step 64. Then, the telematics unit 24 is switched off in step 66.

Moreover, the method 50 includes step 68, in which the timer 42 detects a timeout of a restart timer. More specifically, the telematics unit 24 has been powered down (has been in standby mode) for a predetermined time. Consequently, the controller 30 initiates powering up of the telematics unit 24 in step 70, and the controller 30 controls the power management system 40 such that the telematics unit 24 is powered by the secondary power supply 38 in step 72. Then, in step 74, the communications device 26 attempts to establish a wireless communication link with the external device 22.

Next, in decision block 76, it is determined whether the communication link has been established. If the communication link has been established, step 78 follows, and the telematics unit 24 enters a reporting mode. In reporting mode, the vehicle information stored on the memory device 32 is uploaded to the external device 22 via the wireless communication link.

Subsequently, in step 80, information may be uploaded from the external device 22 to the telematics unit 24 to thereby synchronize the telematics unit 24 and the external device 22. More specifically, new firmware and/or configuration data is uploaded to the telematics unit 24. For instance, in some embodiments, the software of the telematics unit 24 can be updated to a newer version during step 80. Also, the amount and/or type of vehicle information gathered and stored by the telematics unit 24 can be altered during step 80. Then, step 66 follows, and the telematics unit 24 is switched off.

Alternatively, if decision block 76 is answered in the negative, and the communication link is not established, the counter 44 is consulted in decision block 82 to determine how many failed attempts have been made to establish the communication link. If the number of failed attempts is less than a predetermined amount (e.g., three attempts), step 84 follows, and the timer 42 sets the restart timer of the telematics unit 24. Then, step 66 follows, and the telematics unit 24 is switched off. However, if decision block 82 is answered in the negative, and the number of failed attempts exceeds the predetermined amount, step 66 follows, and the telematics unit 24 is switched off.

It will be appreciated that the telematics unit 24 can advantageously communicate with the external device 22 to upload and download information even when the main power supply 18 is disconnected from the telematics unit 24. The secondary power supply 38 can supply sufficient power to the telematics unit 24 in these instances. Accordingly, the user can upload vehicle information and synchronize the external device 22 and the telematics unit 24 even when the ignition switch is in the "OFF" position. As such, gathering vehicle information and synchronizing is much more convenient. Also, power from the main power supply 18 is less likely to be wasted. This can also allow for efficient use of electrical power, and as a result, smaller capacity batteries can be employed and/or more attempts at establishing a wireless connection and performing data transfer can be made.

Moreover, it will be appreciated that the secondary power supply 38 can be electrically connected within the vehicle 10 so as to be recharged while the ignition switch 15 is in the ENGINE ON position. Moreover, it will be appreciated that the telematics unit 24 can encrypt the information being transmitted to and from the telematics unit 24 via the communications device 26 for purposes of privacy.

Certain terminology is used herein for purposes of reference only, and thus is not intended to be limiting. For example, terms such as "upper," "lower," "above," "below," "top," "upward," and "downward" refer to directions in the drawings to which reference is made. Terms such as "front," "back," "rear," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed. It should be noted generally that the term "step", "process", or "operation" is used in this disclosure and claims to refer to a single step, operation, or process or a plurality thereof.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A telematics system for a vehicle with a main power supply, the telematics system comprising:
    a secondary power supply;
    a telematics unit that provides vehicle information, the telematics unit including a wireless communication device that selectively provides two-way communication between the telematics unit and an external device;
    a power management system that selectively causes the telematics unit to be powered by at least one of the main power supply and the secondary power supply;
    a controller that controls the power management system such that the telematics unit is powered by the secondary power supply for communication between the telematics unit and the external device when the telematics unit is electrically disconnected from the main power supply; and
    a counter that counts a number of failed attempts to establish the wireless communication link, wherein the controller causes the telematics unit to reduce power consumption if the number of failed attempts equals a predetermined amount.

2. The vehicle telematics system of claim 1, wherein the controller causes the wireless communication device to attempt to establish a wireless communication link with the external device at a first predetermined time after the telematics unit is electrically disconnected from the main power supply.

3. The vehicle telematics system of claim 2, further comprising a timer, wherein the controller causes the telematics unit to reduce power consumption for a second predetermined amount of time as determined by the timer if the attempt to establish the wireless communication link fails.

4. A telematics system for a vehicle with a main power supply, the telematics system comprising:
    a secondary power supply;
    a telematics unit that provides vehicle information, the telematics unit including a wireless communication device that selectively provides two-way communication between the telematics unit and an external device;
    a power management system that selectively causes the telematics unit to be powered by at least one of the main power supply and the secondary power supply; and
    a controller that controls the power management system such that the telematics unit is powered by the secondary power supply for communication between the telematics unit and the external device when the telematics unit is electrically disconnected from the main power supply, wherein the controller causes the wireless communication device to attempt to establish a wireless communication link with the external device at a first predetermined time after the telematics unit is electrically disconnected from the main power supply; and
    a timer, wherein the controller causes the telematics unit to reduce power consumption for a second predetermined amount of time as determined by the timer if the attempt to establish the wireless communication link fails, and wherein the controller causes the telematics unit to increase power consumption after the second predetermined amount of time and again attempt to establish the wireless communication link with the external device.

5. The vehicle telematics system of claim 4, further comprising a counter that counts a number of failed attempts to establish the wireless communication link, wherein the controller causes the telematics unit to reduce power consumption if the number of failed attempts equals a predetermined amount.

6. The vehicle telematics system of claim 1, wherein the vehicle information is at least one of vehicle identification, distance travelled, vehicle speed, vehicle acceleration, vehicle braking, vehicle location, fuel economy, seatbelt usage, turn signal usage, and time of day of travel.

7. The vehicle telematics system of claim 1, wherein the wireless communication device selectively provides two-way communication between the telematics unit and the external device to at least one of provide updated software from the external device to the telematics unit and change the vehicle information gathered by the telematics unit.

8. A method of operating a vehicle telematics system comprising:
   disconnecting a main power supply of the vehicle from a telematics unit;
   electrically connecting a secondary power supply to the telematics unit with the main power supply disconnected from the telematics unit;
   attempting to establish a wireless two-way communication link between the telematics unit and an external device; and
   counting a number of failed attempts to establish the wireless communication link, and reducing power consumption if the number of failed attempts equals a predetermined amount.

9. The method of claim 8, further comprising attempting to establish the wireless two-way communication link a first predetermined amount of time after the secondary power supply system is electrically connected to the telematics unit.

10. The method of claim 9, further comprising reducing power consumption of the telematics unit for a second predetermined amount of time if the wireless two-way communication link fails to be established.

11. The method of claim 8, further comprising communicating vehicle information between the telematics unit and the external device, wherein the vehicle information is at least one of vehicle identification, distance travelled, vehicle speed, vehicle acceleration, vehicle braking, vehicle location, fuel economy, seatbelt usage, turn signal usage, and time of day of travel.

12. The method of claim 8, further comprising at least one of providing updated software from the external device to the telematics unit and changing the vehicle information gathered by the telematics unit.

13. A method of operating a vehicle telematics system comprising:
   disconnecting a main power supply of the vehicle from a telematics unit;
   electrically connecting a secondary power supply to the telematics unit with the main power supply disconnected from the telematics unit;
   attempting to establish a wireless two-way communication link between the telematics unit and an external device a first predetermined amount of time after the secondary power supply system is electrically connected to the telematics unit:
   reducing power consumption of the telematics unit for a second predetermined amount of time if the wireless two-way communication link fails to be established; and
   increasing power consumption of the telematics unit after the predetermined amount of time and again attempting to establish the wireless two-way communication link.

14. The method of claim 13, further comprising counting a number of failed attempts to establish the wireless communication link, and reducing power consumption if the number of failed attempts equals a predetermined amount.

15. A telematics system for a vehicle with a main power supply, the telematics system comprising:
   a secondary power supply;
   a telematics unit that provides vehicle information, the telematics unit including a wireless communication device that selectively provides two-way communication between the telematics unit and an external device;
   a power management system that selectively causes the telematics unit to be powered by at least one of the main power supply and the secondary power supply;
   a controller that controls the power management system such that the telematics unit is powered by the secondary power supply for wireless communication between the telematics unit and the external device with the telematics unit electrically disconnected from the main power supply;
   a timer, wherein the controller causes the telematics unit to reduce power consumption for a predetermined amount of time as determined by the timer if the attempt to establish the wireless communication link fails, wherein the controller causes the telematics unit to increase power consumption after the predetermined amount of time and again attempt to establish the wireless communication link with the external device; and
   a counter that counts a number of failed attempts to establish the wireless communication link, wherein the controller causes the telematics unit to reduce power consumption if the number of failed attempts equals a predetermined amount.

* * * * *